United States Patent
Swope et al.

(10) Patent No.: US 12,365,083 B2
(45) Date of Patent: Jul. 22, 2025

(54) SHAPE-MEMORY EFFECTOR SYSTEMS

(71) Applicant: ZEBRA TECHNOLOGIES CORPORATION, Lincolnshire, IL (US)

(72) Inventors: Charles Burton Swope, Coral Springs, FL (US); Matthew B. Hayes, Wheaton, IL (US); Robert E. Beach, Los Altos, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 287 days.

(21) Appl. No.: 17/990,462

(22) Filed: Nov. 18, 2022

(65) Prior Publication Data

US 2024/0165793 A1 May 23, 2024

(51) Int. Cl.
| | |
|---|---|
| *B25J 9/12* | (2006.01) |
| *B25J 9/00* | (2006.01) |
| *B25J 9/10* | (2006.01) |
| *B25J 9/16* | (2006.01) |
| *B25J 15/06* | (2006.01) |
| *B25J 17/02* | (2006.01) |

(52) U.S. Cl.
CPC ........... *B25J 9/0084* (2013.01); *B25J 9/0009* (2013.01); *B25J 9/1085* (2013.01); *B25J 9/12* (2013.01); *B25J 9/1664* (2013.01); *B25J 15/0616* (2013.01); *B25J 17/0275* (2013.01)

(58) Field of Classification Search
CPC ........ B25J 17/0275; B25J 9/1085; B25J 9/12; B25J 9/1664; B25J 9/0009; B25J 9/0087; B25J 9/0084; B25J 15/0616
See application file for complete search history.

(56) References Cited

U.S. PATENT DOCUMENTS

| | | | |
|---|---|---|---|
| 6,192,297 B1 * | 2/2001 | Marobin | B25J 9/1666 |
| | | | 700/165 |
| 7,079,923 B2 * | 7/2006 | Abramson | A47L 5/34 |
| | | | 700/254 |
| 11,571,234 B2 * | 2/2023 | Nott | A61B 17/320068 |

(Continued)

OTHER PUBLICATIONS

Bridgwater et al., The Robonaut 2 hand-designed to do work with tools, 2012, IEEE, p. 3425-3430 (Year: 2012).*

(Continued)

*Primary Examiner* — McDieunel Marc

(57) ABSTRACT

An effector system includes: a plurality of effector assemblies configured to engage a target object; a base having a plurality of mounting surfaces for movably supporting the effector assemblies; a plurality of actuators coupled to the base, each actuator including: an actuator housing defining a conduit having a first end and a second end; an output member slidable within the conduit; a first shape-memory transducer affixed between the first end and the output member; a second shape-memory transducer affixed between the second end and the output member; an electrical subassembly configured to control each actuator to cause the output member to slide towards a selected one of the first end and the second end; and a plurality of linkages between respective output members and effector assemblies, each linkage configured to move a corresponding effector assembly relative to the base in response to sliding of the respective output member.

19 Claims, 9 Drawing Sheets

(56) References Cited

U.S. PATENT DOCUMENTS

2022/0380072 A1* 12/2022 Brinkmeyer ............. B25J 15/04
2024/0139552 A1*  5/2024 Duryea ................. A61B 34/10

OTHER PUBLICATIONS

Cala, Variable End-of-Travel Sensor, 1987, IEEE, p. 184-189 (Year: 1987).*
Barrett, Magnetic Particle Clutch Type Linear Electro-Mechanical Servo Actuator Engine Gimbal Control, 1964, IEEE, p. 440-443 (Year: 1964).*

* cited by examiner

SHAPE-MEMORY EFFECTOR SYSTEMS

BACKGROUND

Various object-handling operations, such as removing objects from shelves or other support structures, can be mechanized and/or automated, e.g., with robotic arms or the like. Mechanization of such operations can include deploying effector assemblies including various actuators including linear solenoids and the like. In some applications, however, the use of actuators such as solenoids can result in complex and bulky effectors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
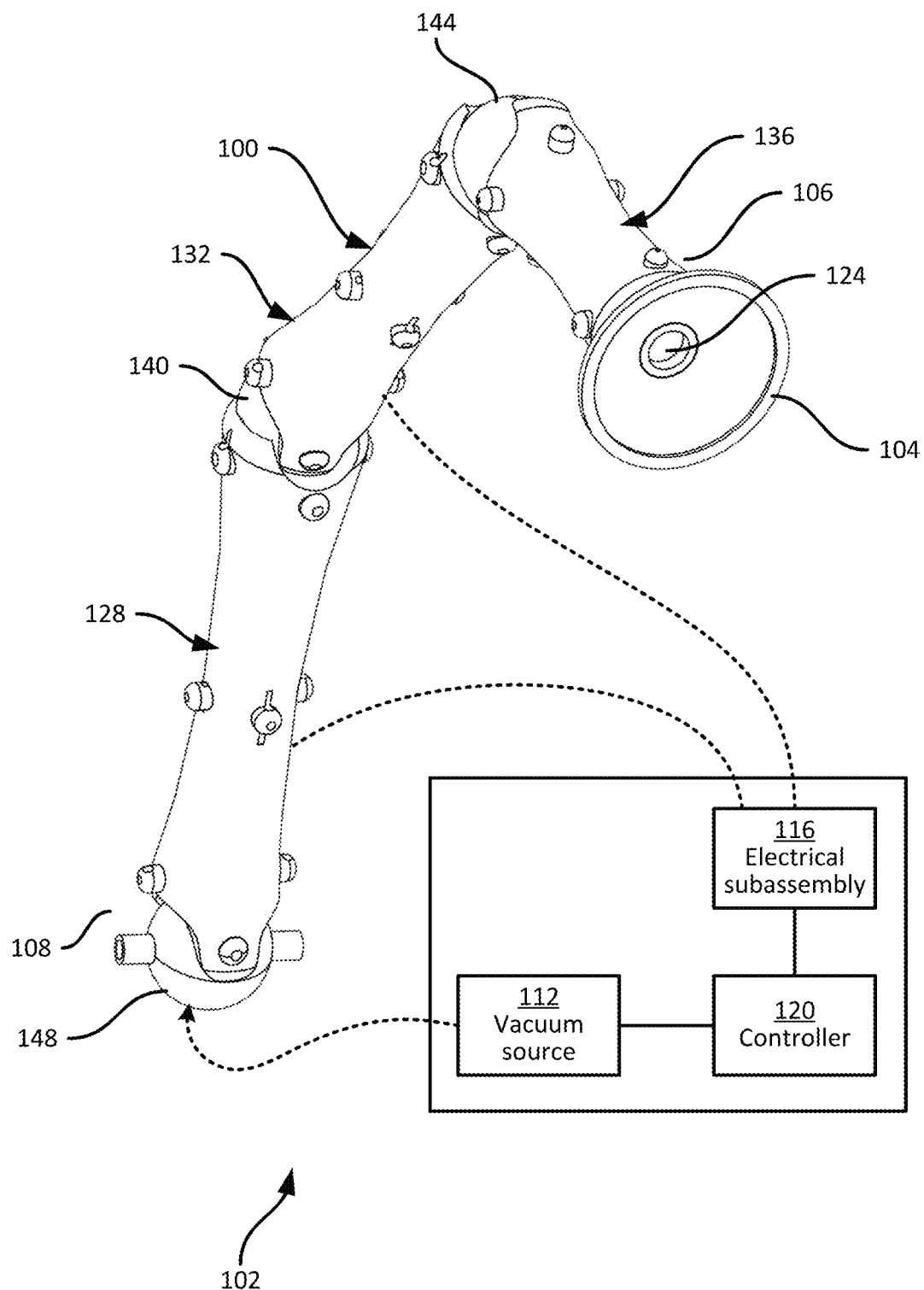
FIG. 1 is a diagram of an effector system including an effector assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to an effector system including: a plurality of effector assemblies configured to engage a target object; a base having a plurality of mounting surfaces for movably supporting the effector assemblies; a plurality of actuators coupled to the base, each actuator including: an actuator housing defining a conduit having a first end and a second end; an output member slidable within the conduit; a first shape-memory transducer affixed between the first end and the output member; a second shape-memory transducer affixed between the second end and the output member; an electrical subassembly configured to control each actuator to cause the output member to slide towards a selected one of the first end and the second end; and a plurality of linkages between respective output members and effector assemblies, each linkage configured to move a corresponding effector assembly relative to the base in response to sliding of the respective output member.

Additional examples disclosed herein are directed to a base assembly for an effector system, the base assembly comprising: a base having a plurality of mounting surfaces for movably supporting corresponding effector assemblies; and a plurality of actuators coupled to the base, each actuator including: an actuator housing defining a conduit having a first end and a second end; an output member slidable within the conduit; a first shape-memory transducer affixed between the first end and the output member; a second shape-memory transducer affixed between the second end and the output member.

Figure 6:
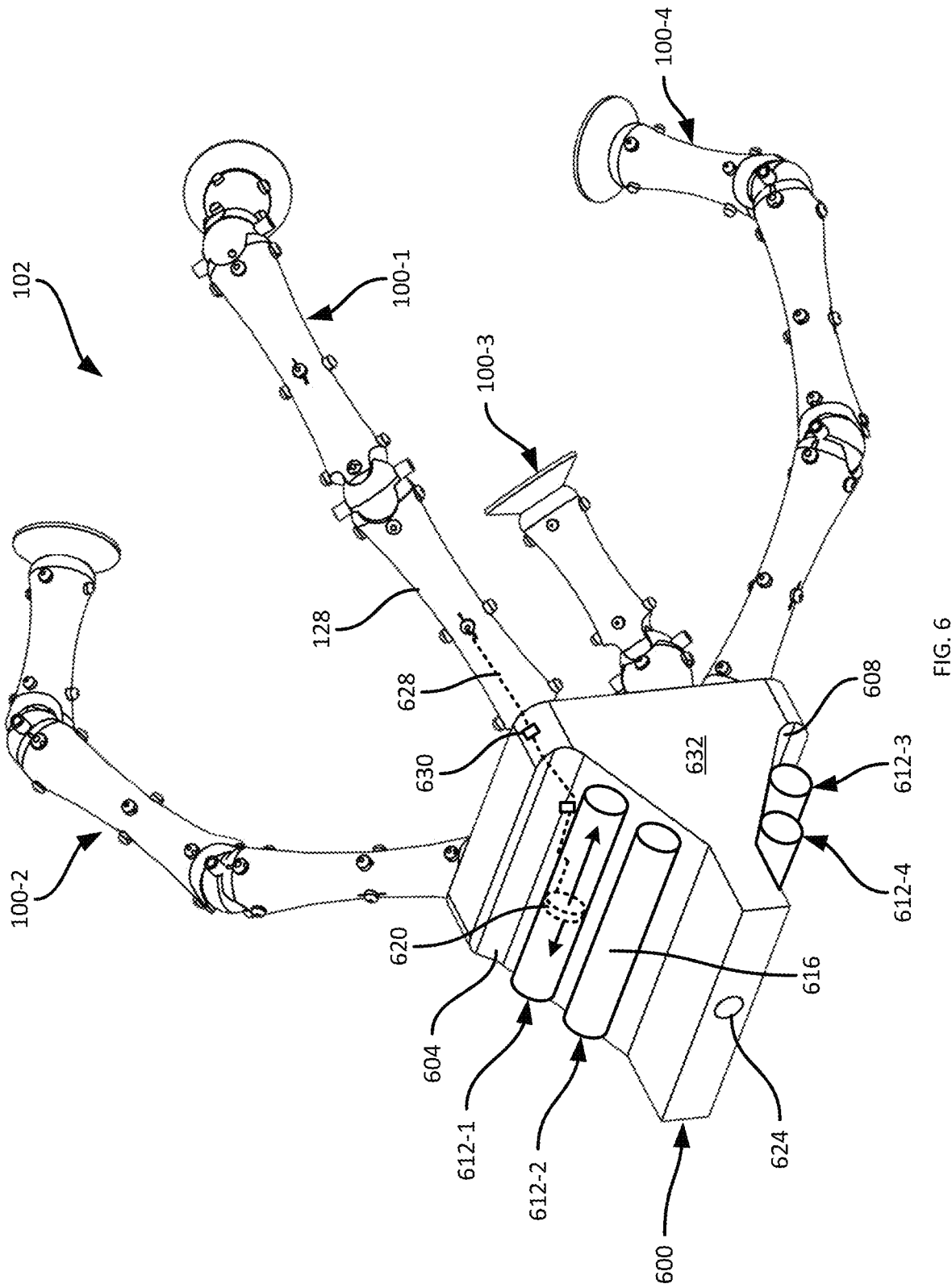
FIG. 6 is a diagram of an effector system including a plurality of effector assemblies.

FIG. 1 illustrates an effector assembly 100 of an object manipulation system 102 (as shown in FIG. 6), e.g., for manipulating objects such as packages or other items on support structures such as shelves. The effector assembly 100 is configured to engage with an object via an effector output such as a suction cup 104 at a distal end 106 of the effector assembly 100, opposite a proximal end 108 of the assembly 100.

The system 102 can include a base or other mounting structure, examples of which are discussed further below, supporting the effector assembly 100 at the proximal end 108. The base or mounting structure can also support, or be connected to, other components of the system 102. Examples of other components of the system 102 include, in the illustrated example, a vacuum source 112 (e.g., a pump or the like), an electrical subassembly 116, and a controller 120 (e.g., a field-programmable gate array (FPGA) or the like). The system 102 can also include a plurality of other effector assemblies 100 having the structural features discussed below in connection with the illustrated effector assembly 100.

Examples of mounting components supporting the proximal end 108 are discussed further below. The controller 120 is configured to enable and disable the vacuum source 112, to apply a vacuum at a distal effector outlet 124 defined by the suction cup 104. Application of the vacuum at the outlet 124 facilitates engagement between the suction cup 104 and an object such as a parcel or the like on a support structure.

The controller 120 is also configured to control the electrical subassembly to apply electrical signals to various portions of the assembly 100, as discussed below, to articulate and/or move the assembly 100, e.g., to pull the object engaged by the suction cup 104 from a support structure and into a bin or other receptacle for transport.

The assembly 100 includes a plurality of segments, including at least a first segment 128 and a second segment 132. In the illustrated example, the assembly 100 also includes a third segment 136 carrying the suction cup 104. In other examples, the assembly 100 can include additional segments. The segments 128, 132, and 136 are articulated, such that the segment 136 can move relative to the segment 132, and the segment 132 can move relative to the segment 128. In some examples, the segment 128 can also move relative to the base mentioned earlier. Relative movement between adjacent segments is facilitated by respective joints 140 and 144. In some examples, a further joint 148 at the proximal end 108 can permit the segment 128 to move relative to the base.

Movement of the segments 128, 132, and 136 relative to one another is effected by shape-memory transducers disposed within at least the first segment 128 and the second segment 132. The shape-memory transducers are activated by the electrical subassembly 116. Under the control of the controller 120, the electrical subassembly 116 can selectively open or close various circuits defined by the segments 128, 132, and 136 to alter the current state of each shape-memory transducer and thereby effect relative movement between adjacent segments.

Figure 2:
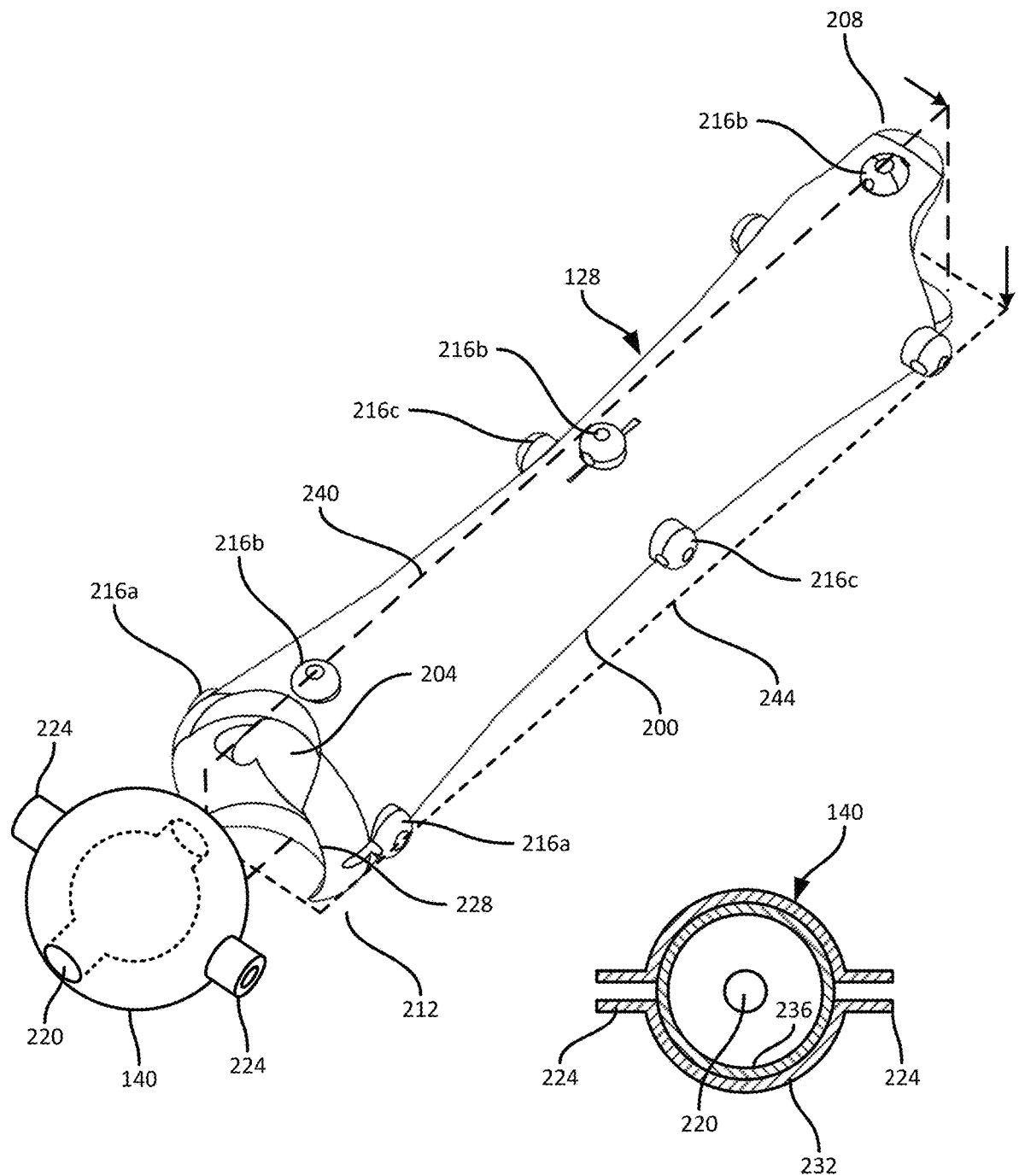
FIG. 2 is a perspective view of a segment of the effector assembly of FIG. 1, and a cross-sectional view of a ball joint of the assembly of FIG. 1.

Turning to FIG. 2, the segment 128 and the joint 140, implemented in this example as a ball joint, are shown isolated from the assembly 100. The segments 132 and 136 share certain structural features with the segment 128. The segment 132, for example, may include the same structural features as discussed below in conjunction with the segment 128, although the segment 132 may have a reduced length between proximal and distal ends in comparison with the segment 128.

The segment 128 includes, as shown in FIG. 2, a generally cylindrical wall 200 defining a conduit (e.g., a hollow channel) 204 extending between a proximal end 208 of the segment 128 and a distal end 212 of the segment 128. The ends 208 and 212 are open, such that the conduit 204 is in communication with the exterior of the segment 128 at either end. The segment 128 also includes a plurality of anchors 216a, 216b, and 216c extending from an outer surface of the wall 200. Certain anchors 216 connect mechanical linkage components (e.g., rods, wires, cables, or the like) between the segment 128 and an adjacent segment (e.g., the segment 132), enabling shape-memory transducers in the segment 128 to move the adjacent segment 132. The linkage components are not shown in FIG. 2 for clarity of illustration. Certain anchors 216 can also receive electrical signal lines, such as conductive wires or the like, for controlling the shape-memory transducers.

In the present example, the anchors 216a can receive a distal end of a mechanical linkage, for moving the segment 128 (e.g., from a proximal segment or from the base mentioned earlier). The anchors 216b can be configured to movably couple mechanical linkage components to the segment 128, e.g., permitting the linkage components to slide in response to movement of the shape-memory transducers. The anchors 216c can connect to the electrical subassembly 116, e.g., to selectively ground the wall 200. The wall 200, or at least an inner surface thereof, can be conductive, and the anchors 216c can be electrically connected to the inner surface.

FIG. 2 also illustrates an example ball joint 140, including a channel 220 extending therethrough to permit air flow through the segment 128 when the ball joint 140 (and, in some examples, additional segments) is connected at the distal end 212 of the segment 128. Each ball joint 140, 144, 148 of the assembly 100 includes a channel 220, such that the conduits defined through each segment 128, 132, and 136 are in fluid communication and a vacuum applied by the vacuum source 112 is communicated to the outlet 124. The ball joint 140 further includes axial protrusions 224. As seen from FIG. 2, the protrusions 224 abut a proximal edge 228 of the segment 128 when the ball joint 140 is installed, restricting the range of motion of the segment 128 about the ball joint 140 to rotation in a single plane containing the conduit (e.g., perpendicular to the protrusions 224).

FIG. 2 also illustrates the ball joint 140 in cross section. As seen in the cross-sectional view, the ball joint 140 includes a non-conductive outer shell 232 (e.g., Teflon™ or the like), and a conductive core 236, e.g., of aluminum, a carbon-fiber based composite, or the like. The protrusions 224 can be open to expose the conductive core 236, enabling electrical signals to be applied to the conductive core 236. As discussed below, the conductive core 236 is connected to the shape-memory transducers, which are electrically activated, and application of electrical signals to the ball joint 140 can therefore control one or more shape-memory transducers.

Figure 3A:
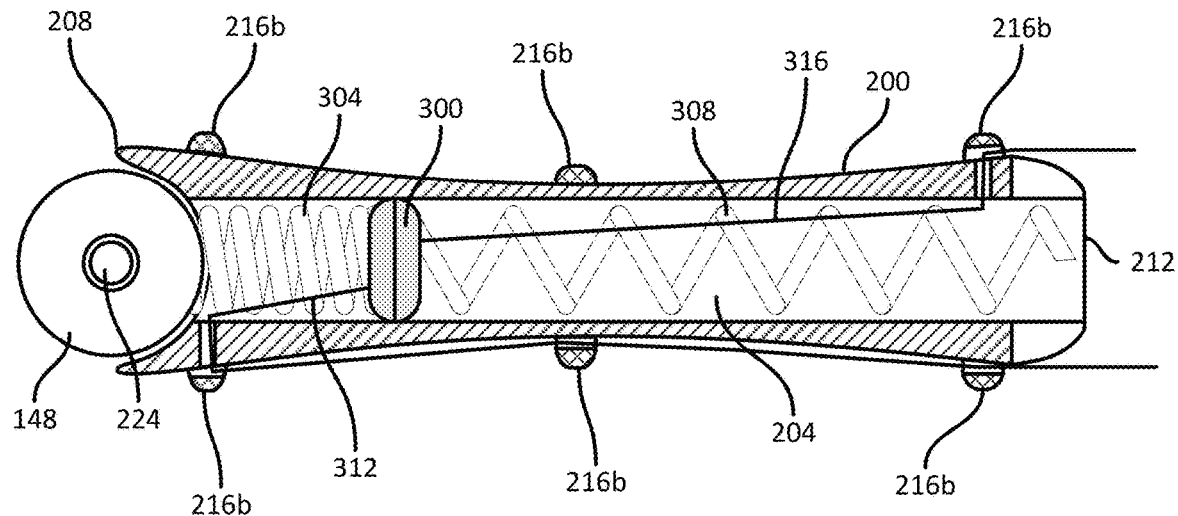
FIG. 3A is a first cross-sectional view of the segment of FIG. 2.
Figure 3B:
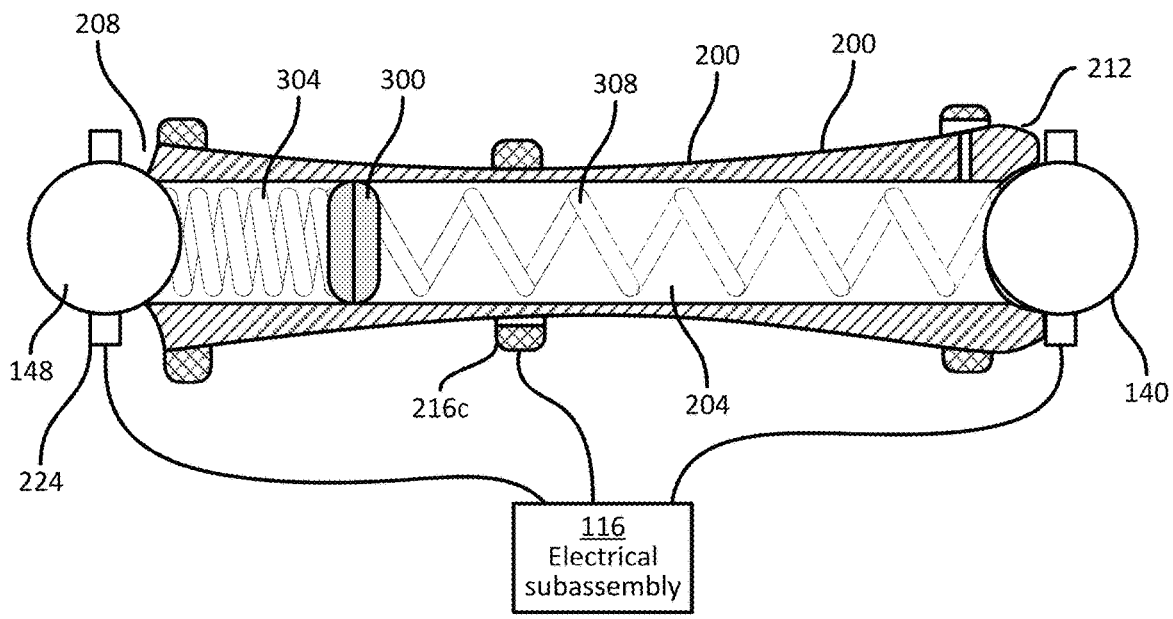
FIG. 3B is a second cross-sectional view of the segment of FIG. 2.

FIG. 3A illustrates a first cross-sectional view taken at the plane 240 shown in FIG. 2, and FIG. 3B illustrates a second cross-section view taken at the plane 244 shown in FIG. 2. The cross-sectional views of FIGS. 3A and 3B illustrate various components of the assembly 100 disposed within the segment 128. The conduit 204 houses an output member 300 slidable within the conduit 204, e.g., to place the output member 300 at varying distances from the proximal end 208 and the distal end 212. The output member 300 can be disc-shaped or toroidal, and contacts the inner surface of the wall 200. Further, at least an outer surface of the output member 300 is electrically conductive.

The conduit 204 also houses a first shape-memory transducer 304, affixed between the proximal end 208 and the output member 300, and a second shape-memory transducer 308, affixed between the output member 300 and the distal end 212. The shape-memory transducers 304 and 308 are fabricated from a shape-memory material such as a nickel-titanium alloy, or the like. In the present example, each transducer 304, 308 includes a helical coil of a nickel-titanium alloy, which may be coated with a flexible non-conductive polymer or other non-conductive coating. Together, the output member 300 and the shape-memory transducers may be referred to as an actuator (e.g., a linear actuator, in this example).

The transducers 304 and 308 have shape-memory, in that each transducer has a memory state, to which the transducer returns in response to an environmental stimulus, such as being heated to a threshold temperature. The particular temperature at which a transducer returns to the memory state can be tuned via selection of the specific alloy used for the transducer. Each transducer 304, 308 can therefore be plastically deformed into a deformed state, and remain in the deformed state until application of a suitable stimulus causes the transducer to return to the memory state. In the present example, the transducer 304 is shown in a deformed state, in which the coil is compressed relative to the memory state of the transducer 304. The transducer 308 is shown in the memory state. In this example, the transducers 304 and 308 have the same physical configuration in the memory state, but in other examples the transducers 304 and 308 may have different memory states from one another.

In the illustrated example, energizing the transducer 304 in the deformed state causes the transducer 304 to forcefully expand towards the memory state. In other examples, the deformed and memory states can be reversed, e.g., such that the transducer 304 is in the memory state, and the transducer 308 is in the deformed state. In such examples, energizing the transducer 308 in the deformed state causes the transducer 308 to forcefully contract towards the memory state.

Each transducer is connected physically and electrically at one end to a ball joint (e.g., the ball joint 148 for the transducer 304, and the ball joint 140 for the transducer 308). Specifically, for example, one end of the transducer can be inserted into the channel 220 of the corresponding ball joint, to engage with the conductive core 236. Further, the opposing end of each transducer is connected physically and electrically to the output member 300. The transducers 304 and 308 are isolated from one another by the output member 300. For example, the output member 300 can include two conductive portions joined by an isolator.

The assembly 100 also includes a mechanical linkage between the output member 300 and an adjacent segment. As shown in FIG. 3A, the linkage includes a first line 312 (e.g., one or more rods, cables, wires, or the like) extending from the output member 300 to an adjacent segment (e.g., the segment 132) via an anchor 216b between the output member 300 and the proximal end 208. The line 312 extends from the output member 300 to an anchor 216b adjacent to the proximal end 208, and then travels towards the distal end 212 for connecting with the next distal segment.

The linkage also includes, in this example, a second line 316 extending from the output member 300 to the adjacent segment via another anchor 216b between the output member 300 and the distal end 212. In other words, the second line 316 travels in generally the same direction throughout its course, as opposed to the first line 312. The lines 312 and 316 extend in opposite directions from the output member 300, before travelling in a common direction to the adjacent segment (e.g., the segment 132). Movement of the output member 300 in either direction within the conduit 204 therefore applies opposing forces on the lines 312 and 316. For example, movement of the output member 300 towards the distal end 212 exerts tension on the first line 312, and releases tension on the second line 316. Movement of the output member 300 towards the proximal end 208 releases tension on the first line 312, and exerts tension on the second line 316. As discussed below, varying tension applied by the lines 312 and 316 causes the adjacent segment 132 to rotate relative to the segment 128.

Movement of the output member 300 is controlled by the application of electrical signals to the transducers 304 and 308. As shown in FIG. 3B, the assembly 100 includes electrical connections (e.g., conductive wires or the like) from the electrical subassembly 116 to the ball joint 148, the ball joint 140, and an anchor 216c. The electrical subassembly 116 can include a bank of switches or other control circuitry, configured to apply a control voltage to either or both of the ball joints 148 and 140. The electrical subassembly can further open or close a ground circuit connected with the anchor 216c, to complete or break a circuit travelling from either or both of the ball joints 140 and 148, through either or both of the transducers 304 and 308, and to the anchor 216c.

For example, when the electrical subsystem 116 applies a signal to the ball joint 148, and completes the ground circuit connected to the anchor 216c, current flows from the conductive core 236 of the ball joint 148, through the transducer 304 to the output member 300, from the output member 300 to the inner surface of the wall 200, and returns to the electrical subassembly 116 via the anchor 216c. The current increases the temperature of the transducer 304, and when the transducer 304 reaches a threshold temperature, the transducer 304 expands to a memory state, moving the output member 300 towards the distal end 212 and compressing the transducer 308 out of a memory state and into a deformed state. The movement of the output member 300 applies or releases tension on the lines 312 and 316 as noted above.

As a further example, application of a signal to the ball joint 140, with the ground connection closed causes current to flow through the transducer 308, biasing the transducer 308 to the memory state and shifting the output member 300 back towards the proximal end 208, as well as deforming the transducer 304. Movement of the output member 300 applies or releases tension on the lines 312 and 316 in a configuration opposite to that applied by movement of the output member 300 towards the distal end 212.

Cooling of the transducers 304 and 308 can be achieved by the application of a vacuum to the conduit 204 from the vacuum source 112. The flow of air through the conduit 204, in other words, can accelerate cooling of the transducers 304 and 308 after an activation, facilitating deformation of the transducers 304 and 308.

Figure 4:
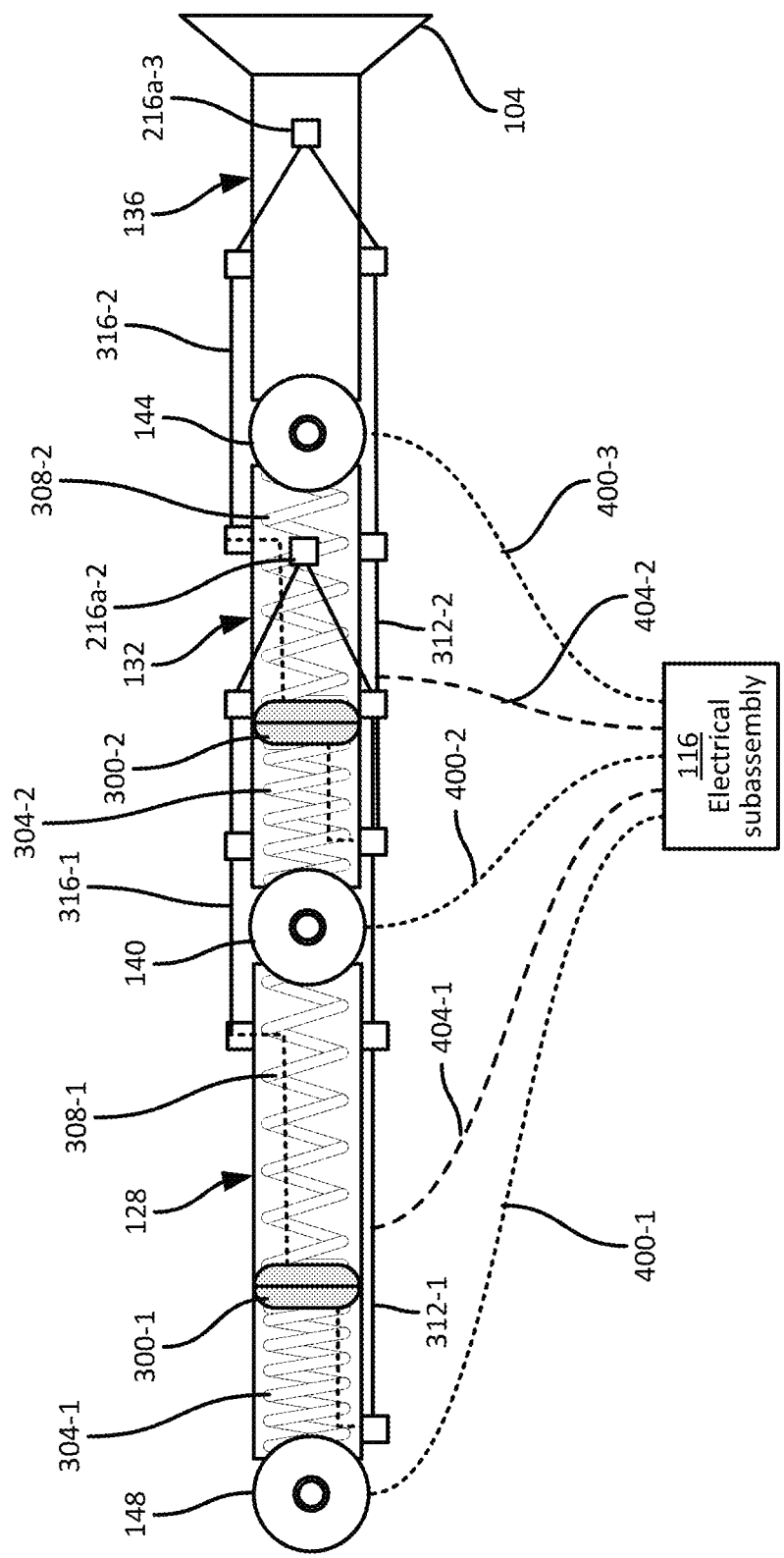
FIG. 4 is a simplified view of the assembly of FIG. 1 in a first operational configuration.

Turning to FIG. 4, a simplified representation of the assembly 100 is illustrated, showing electrical connections 400-1, 400-2, and 400-3 (referred to collectively as the electrical connections 400, and generically as an electrical connection 400; similar nomenclature is used elsewhere herein) from the electrical subassembly 116 to the ball joints 148, 140, and 144 respectively. FIG. 4 also illustrates a ground connection 404-1 from the segment 128 to the electrical subassembly 116 (the anchor 216c is omitted for clarity), and a ground connection 404-2 from the segment 132 to the electrical subassembly 116. Various other components of the assembly 100 are also shown, with suffixes introduced according to which of the segments 128, 132, and 136 the components are housed in or on. That is, the segment 128 houses an output member 300-1, transducers 304-1 and 308-1, and linkage lines 312-1 and 316-1. The segment 132 houses an output member 300-2, transducers 304-2 and 308-2, and linkage lines 312-2 and 316-2. Further, selected anchors 216 are labelled, including an anchor 216a-2 on the segment 132, and an anchor 216a-3 on the segment 136.

In response to one or more commands from the controller 120, the electrical subassembly 116 can close a switch connected with the ground connection 404-1, to ground the segment 128, as well as apply an electrical signal to the ball joint 148 via the connection 400-1. Electrical current therefore flows from the electrical subassembly 116, through the transducer 304-1, and back to the electrical subassembly 116 via the output member 300-1.

Figure 5:
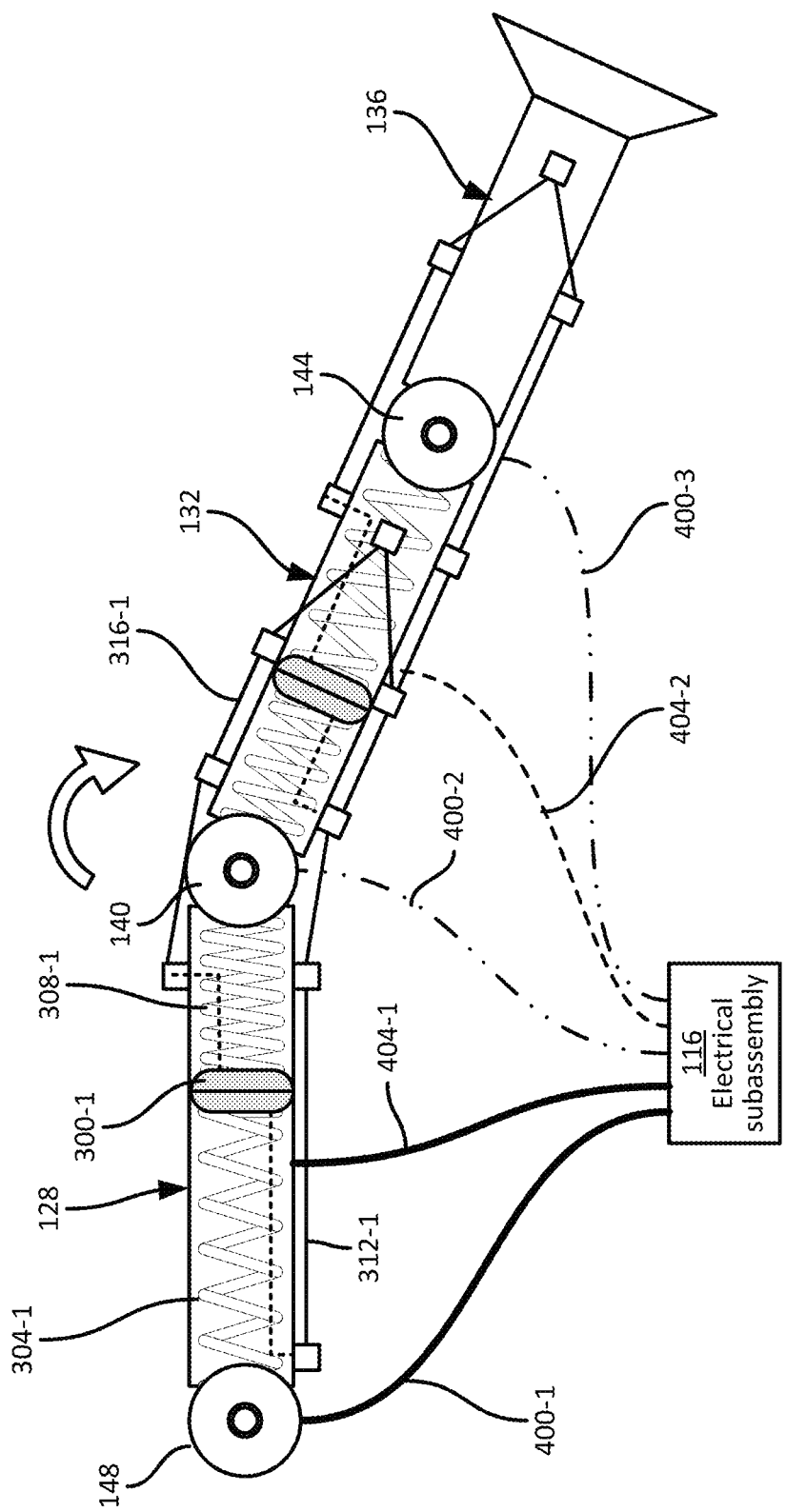
FIG. 5 is a simplified view of the assembly of FIG. 1 in a second operational configuration.

As shown in FIG. 5, in response to the above electrical signal, the transducer 304-1 is biased to the memory state, moving the output member 300-1 towards the segment 132 and deforming the transducer 308-1. Further, the output member 300-1 applies tension to the line 312-1 and releases tension on the line 316-1, causing the segment 132 to rotate about the ball joint 140. As will be apparent, by selectively applying signals to the electrical connections 400 and opening or closing the ground connections 404, the electrical subassembly 116 can cause bi-directional rotation of each of the segments 132 and 136, e.g., to engage with an object to be manipulated.

The lines 312 and 316, and the connections 400 and 404 can be coupled to the segments via a dielectric sleeve or other coating, e.g., to reduce the risk of tangling or catching on nearby objects. Further, such a sleeve can serve to retain the segments against the respective ball joints.

Under certain conditions, one effector assembly, such as the effector assembly 100 discussed above, may be insufficient to manipulate an object. For example, certain objects may include surfaces that an effector assembly 100 has difficulty engaging (e.g., flexible plastic wrapping or the like). Some objects may also have irregular shapes, e.g., with rounded portions or the like, that render engagement by an effector assembly 100 difficult. In further examples, the size and/or weight of an object may be such that one effector assembly 100 has difficulty maintaining engagement with the object while pulling the object from a support structure, or performing other manipulations.

The system 102 can therefore include a plurality of effector assemblies 100, supported on a base or other mounting structure that is configured to control the positions of the effector assemblies 100. For example, turning to FIG. 6, an example implementation of the system 102 is shown, including four effector assemblies 100-1, 100-2, 100-3, and 100-4. Each of the effector assemblies 100 can be configured as described above in connection with the effector assembly 100 introduced in FIG. 1.

The system 102 as illustrated in FIG. 6 also includes a base 600, which can also be referred to as a mounting block. The base 600 movably supports each of the effector assemblies 100, and facilitates independent control of the positions of the effector assemblies 100. For example, the base 600 can include a rear surface (e.g., a first rear surface 604, and a second rear surface 608, in this example) carrying a plurality of actuators 612-1, 612-2, 612-3, and 612-4. As seen in FIG. 6, the number of actuators 612 carried by the base 600 is equal to the number of effector assemblies 100. Each actuator 612 is configured to control the movement of a corresponding one of the effector assemblies 100. For example, the actuator 612-1 controls the movement of the effector assembly 100-1, the actuator 612-2 controls the movement of the effector assembly 100-2, and so on. In other examples, the base 600 can carry fewer actuators 612 than there are effector assemblies 100, and one or more of the actuators 612 can be configured to control the movement of more than one effector assembly 100.

Each actuator 612 includes a housing 616 containing two shape-memory transducers and an output member 620, as described above in connection with the segment 128. That is, the housing 616 defines a conduit therethrough between first and second ends, in which the output member 620 can slide. The conduit need not permit passage of a vacuum in this example, however. The vacuum source 112 can be connected to an inlet 624 of the base 600, and the base 600 can include one or more conduits therethrough, connecting the inlet 624 with a forward surface of the base 600 that is engaged with the effector assemblies 100.

The electrical assembly 116 is connected to the actuators 612 as described earlier in connection with the segment 128. For example, each actuator 612 can include first and second electrical connections to the electrical subassembly 116 at the ends thereof, and a ground connection between the ends. Selectively activating combinations of the above connections can therefore cause the output member 620 of each actuator 612 to move towards the first end, or towards the second end of the actuator 612.

The system 102 also includes a plurality of linkages between each output member 620 and a corresponding one of the effector assemblies 100. In the example shown in FIG. 6, a linkage 628 is illustrated from the output member 620 of the actuator 612-1 to the effector assembly 100-1. The linkage 628 can include a suitable combination of cables, wires, rods, or the like. As will be apparent from FIG. 6, movement of the output member 620 to the left (in the illustrated orientation) applies tension to the linkage 628, pulling the effector assembly 100-1 (more specifically, the segment 128 of the effector assembly 100-1) back towards the base 600. Movement of the output member 620 in the opposite direction releases tension on the linkage 628, and may allow the effector assembly 100-1 to move away from the base 600. In other examples, the base 600 can carry two linkages for each actuator 612, as described earlier in connection with FIG. 3, to facilitate active movement of the corresponding effector assembly 100-1 in two directions. The base 600 can further include one or more anchors 630 to route the linkage 628 and any other linkages supported on the base 600.

In other examples, the actuators 612 can be supported on the base 600 in other arrangements. For example, one or more actuators 612 can be affixed to a side surface 632 of the base 600, rather than the rear surfaces 604 and/or 608. In further examples, the actuators 612 may be disposed inside the base 600, rather than carried externally on the base 600.

Figure 7:
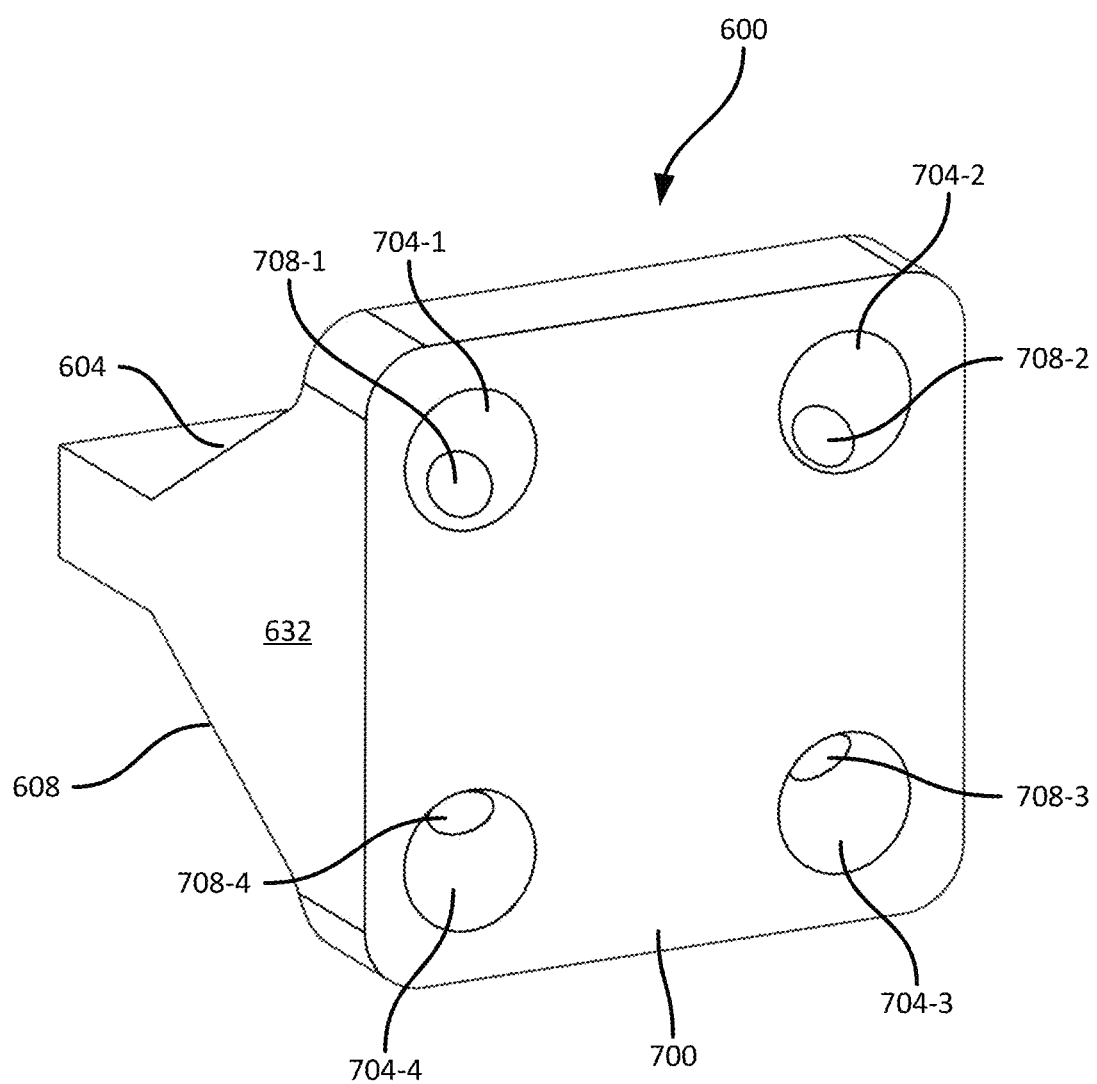
FIG. 7 is a perspective view of a base of the system of FIG. 6.
Figure 8:
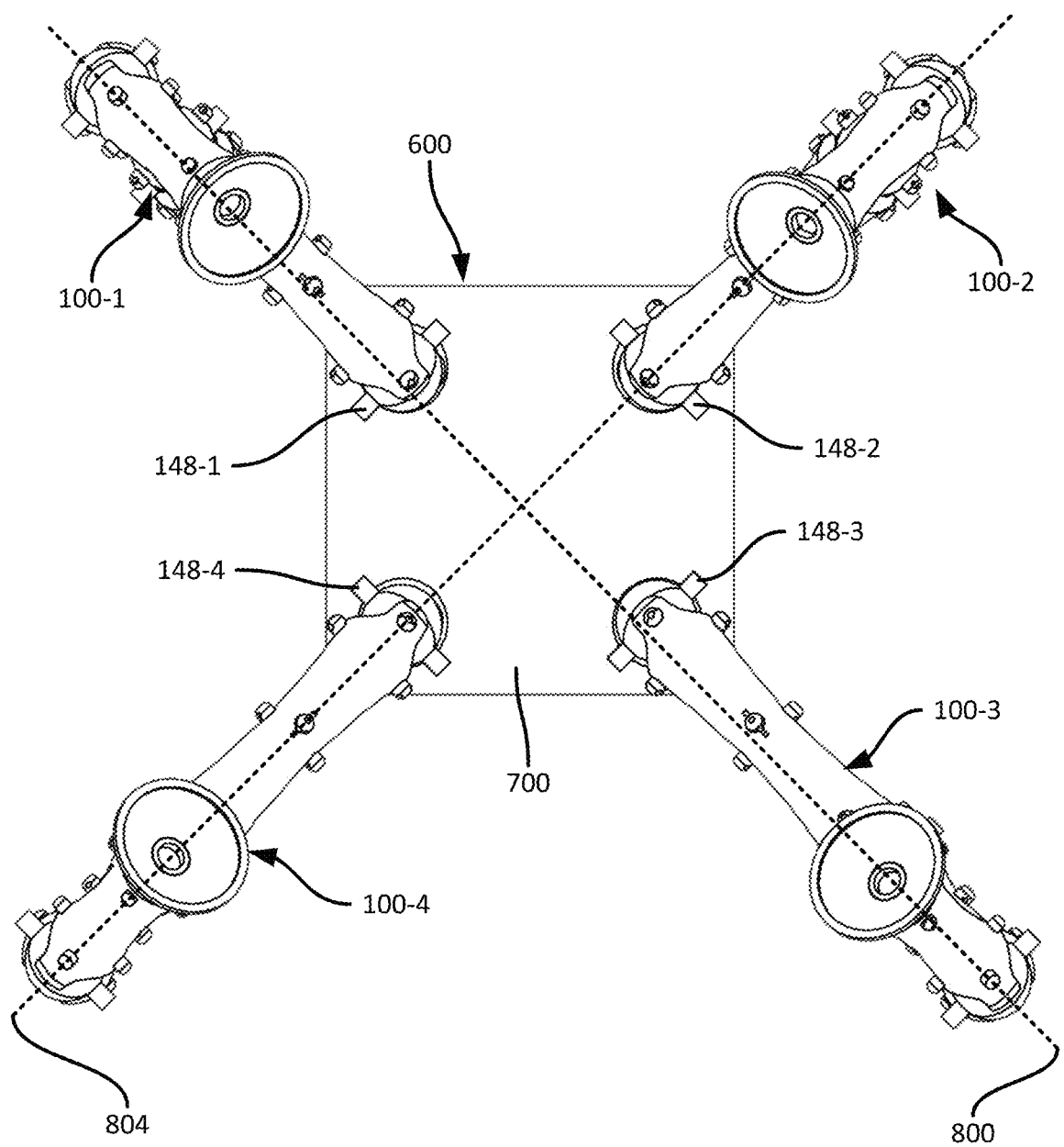
FIG. 8 is a front view of the system of FIG. 6.

FIG. 7 illustrates the base 600 in isolation. As seen in FIG. 7, the base 600 includes a front surface 700 opposite the rear surfaces 604 and 608. The front surface 700 includes a plurality of mounting surfaces 704-1, 704-2, 704-3, and 704-4, each configured to movably support a corresponding one of the effector assemblies 100. For example, the mounting surfaces 704 can include cup-shaped sockets, configured to accept the ball joints 148 of the effector assemblies 100. In some examples, the mounting surfaces 704 can include slots or ridges therein, and/or channels to accept the axial protrusions 224 of the ball joints 148, to limit the range of motion of each effector assembly 100 to rotation relative to the base in a single plane. Turning briefly to FIG. 8, in the illustrated example, the effector assemblies 100-1 and 100-3 are permitted to rotate relative to the base 600 (about the joints 148-1 and 148-3, respectively) within a first plane 800. The effector assemblies 100-2 and 100-4 are permitted to rotate relative to the base 600 (about the joints 148-1 and 148-3, respectively) within a second plane 804. A wide variety of other arrangement of effector assemblies 100 and planes of movement can also be implemented, e.g., based on the nature of the target objects with which the system 102 is expected to interact.

Returning to FIG. 7, each mounting surface 704 also includes a corresponding outlet 708-1, 708-2, 708-3, and 708-4. The outlets 708 are connected to the inlet 624 by one or more conduits defined within the base 600. The vacuum supply 112 can therefore apply a vacuum to the suction cups 104 of the effector assemblies 100 via the inlet 624, the conduits, and the outlets 708.

Figure 9:
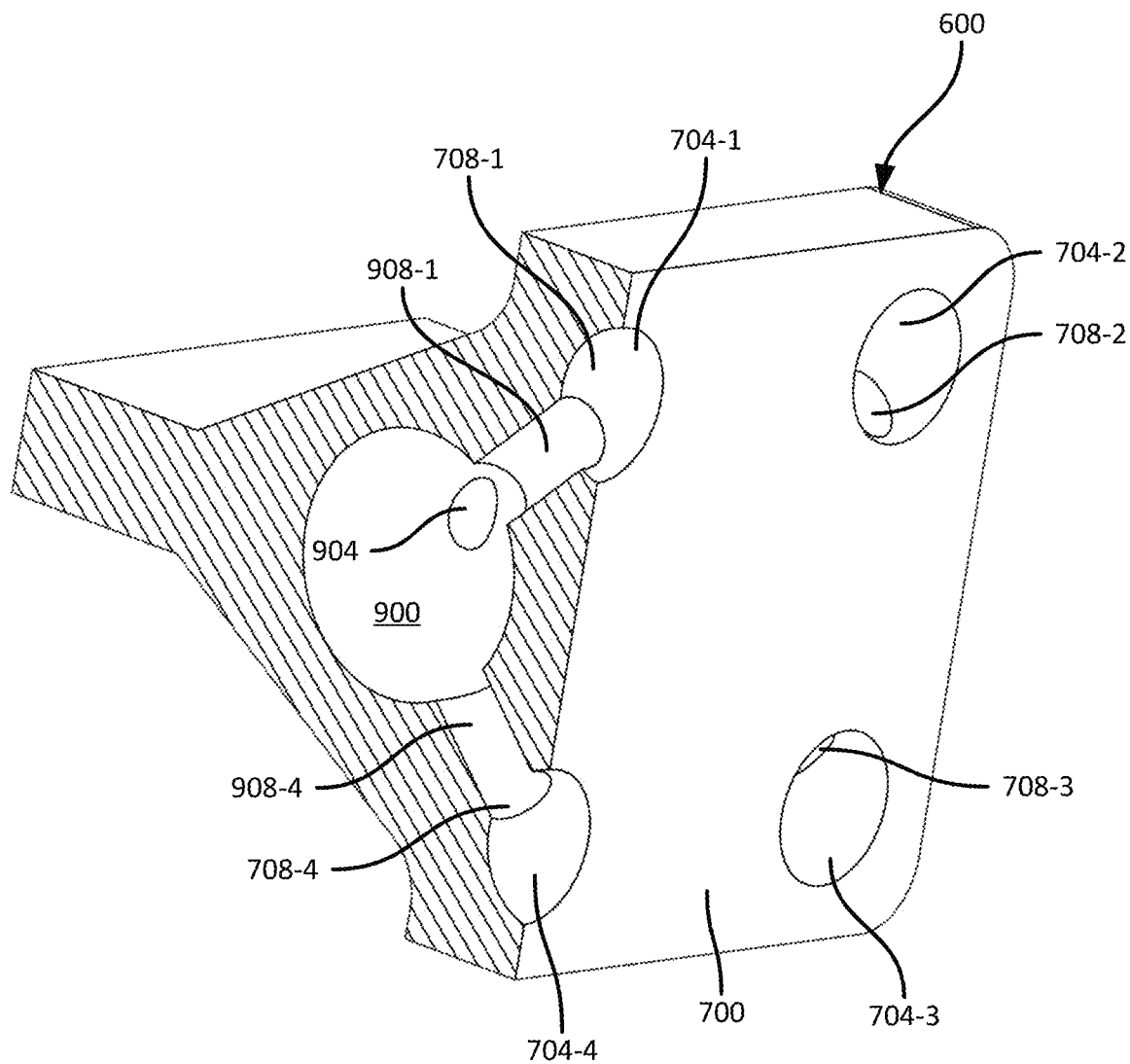
FIG. 9 is a cross-sectional view of the base of FIG. 7.

Turning to FIG. 9, a cross section of the base 600 is shown, illustrating an example set of conduits between the inlet 624 and the outlets 708. As seen in FIG. 9, the base 600 includes an interior chamber 900 and a first conduit 904 in fluid communication with the chamber 900. The first conduit 904 extends to the inlet 624. The base 600 also defines a plurality of second conduits 908-1, 908-4 connecting the chamber 900 with the outlets 708-1, and 708-4 respectively (as well as conduits 908 corresponding to the outlets 708-2 and 708-3). A vacuum applied at the inlet 624 is therefore applied at each outlet 708, via the first conduit 904, the chamber 900, and the second conduits 908.

In other examples, the base 600 includes distinct inlets paired with each mounting surface 704 by a distinct conduit. The application of a vacuum at each effector assembly 100 can therefore be controlled independently, e.g., by providing the vacuum source 112 with separately controllable pumps, and/or with a valve manifold controllable to apply a vacuum to selected ones of the inlets.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An effector system, comprising:
a plurality of effector assemblies configured to engage a target object;
a base having a plurality of mounting surfaces for movably supporting the effector assemblies;
a plurality of actuators coupled to the base, each actuator including:
an actuator housing defining a conduit having a first end and a second end;
an output member slidable within the conduit;
a first shape-memory transducer affixed between the first end and the output member;
a second shape-memory transducer affixed between the second end and the output member;
an electrical subassembly configured to control each actuator to cause the output member to slide towards a selected one of the first end and the second end; and
a plurality of linkages between respective output members and effector assemblies, each linkage configured to move a corresponding effector assembly relative to the base in response to sliding of the respective output member.

2. The effector system of claim 1, wherein the electrical subassembly is configured to control each actuator by:
selectively supplying current to (i) bias the first shape-memory transducer to a first memory state and bias the second shape-memory transducer to a second deformed state, for sliding the output member in a first direction, or (ii) bias the second shape-memory transducer to a second memory state and bias the first shape-memory transducer to a first deformed state, for sliding the output member in a second direction.

3. The effector system of claim 1, wherein the base includes a front surface, and wherein each mounting surface includes a joint socket defined in the front surface.

4. The effector system of claim 3, wherein the base includes a rear surface carrying at least one of the actuators.

5. The effector system of claim 4, wherein the base includes a first rear surface carrying a first subset of the actuators, and a second rear surface carrying a second subset of the actuators.

6. The effector system of claim 1, wherein the plurality of actuators is equal in number to the plurality of effector assemblies.

7. The effector system of claim 1, wherein the base further comprises:
an inlet;
an outlet at one of the mounting surfaces; and
a conduit extending through the base from the inlet to the outlet.

8. The effector system of claim 7, wherein the base further comprises:
respective outlets at each mounting surface;
a first conduit extending into the base from the inlet; and
respective second conduits extending from each outlet to the first conduit.

9. The effector system of claim 7, further comprising:
a vacuum source configured to apply a vacuum to the inlet for transmission of the vacuum to the outlet via the conduit;
wherein each effector assembly defines an additional conduit in communication with the conduit, and terminating at a distal effector outlet for applying the vacuum to the target object.

10. The effector system of claim 1, wherein the plurality of linkages includes, for each actuator:
a first linkage between the output member and a first side of a corresponding effector assembly; and
a second linkage between the output member and a second side of the corresponding effector assembly.

11. The effector system of claim 1, wherein
the output member of each actuator electrically isolates the first shape-memory transducer from the second shape-memory transducer, and includes a conductive outer surface; and
an inner surface of the actuator housing is conductive.

12. The effector system of claim 11, wherein each actuator further comprises:
a first electrical connection at the first end for applying a current to the first shape-memory transducer;
a second electrical connection at the second end for applying a current to the second shape-memory transducer; and
a ground connection to the conductive inner surface of the actuator housing, between the first end and the second end.

13. A base assembly for an effector system, the base assembly comprising:
a base having a plurality of mounting surfaces for movably supporting corresponding effector assemblies; and
a plurality of actuators coupled to the base, each actuator including:
an actuator housing defining a conduit having a first end and a second end;
an output member slidable within the conduit;
a first shape-memory transducer affixed between the first end and the output member;
a second shape-memory transducer affixed between the second end and the output member.

14. The base assembly of claim 13, further comprising a plurality of linkages between respective output members and effector assemblies, each linkage configured to move a corresponding effector assembly relative to the base in response to sliding of the respective output member.

15. The base assembly of claim 13, wherein the base includes a forward surface, and wherein each mounting surface includes a joint socket defined in the forward surface.

16. The effector system of claim 15, wherein the base includes a rear surface carrying at least one of the actuators.

17. The effector system of claim 16, wherein the base includes a first rear surface carrying a first subset of the actuators, and a second rear surface carrying a second subset of the actuators.

18. The effector system of claim 13, wherein the base further comprises:
an inlet;
an outlet at one of the mounting surfaces; and
a conduit extending through the base from the inlet to the outlet.

19. The effector system of claim 18, wherein the base further comprises:
respective outlets at each mounting surface;
a first conduit extending into the base from the inlet; and
respective second conduits extending from each outlet to the first conduit.

* * * * *